United States Patent Office 2,902,471
Patented Sept. 1, 1959

2,902,471

EPOXY ETHERS, THEIR POLYMERS AND DERIVATIVES

Pieter Bruin, Amsterdam, Netherlands, assignor to Shell Development Company, New York, N.Y., a corporation of Delaware No Drawing. Application May 13, 1957
Serial No. 658,518

Claims priority, application Netherlands May 17, 1956

7 Claims. (Cl. 260—47)

This invention relates to a new class of epoxy ethers and to a method for their preparation. More particularly, the invention relates to new epoxy ethers of certain new polyhydroxy-phenylchroman derivatives, and to the utilization of the epoxy ethers, particularly in the preparation of cross-linked insoluble polymers.

Specifically, the invention provides new and particularly useful polyepoxide polyethers comprising polyethers of epoxy-substituted monohydric alcohols and polyalkylhydroxy-phenylchroman derivatives containing at least three phenolic hydroxyl groups per molecule.

As a special embodiment, the invention provides glycidyl ethers of polyalkylhydroxy-phenylchroman derivatives of the formula

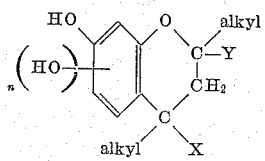

in which X and Y are dissimilar and either an alkyl group or a

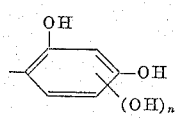

group wherein $n$ is 1 or 0, the alkyl groups preferably being methyl groups.

The invention also provides cross-linked products obtained by reactive the above-described new epoxy polyethers with epoxy curing agents.

Glycidyl polyethers of dihydric phenols, such as glycidyl ethers of 2,2-bis(4-hydroxyphenyl)propane can be cured to form hard chemical resistant products. These materials in combination with curing agents, such as amines, are being used on a commercial basis for the preparation of various types of castings, pottings and many types of coating compositions. The use of these materials in some of these applications, however, has been rather limited, as their cured products are fairly readily subject to deformation at elevated temperatures.

It is an object of the invention, therefore, to provide a new class of epoxy ethers. It is a further object to provide new epoxy ethers of certain new polyhydroxy-phenylchroman derivatives and a method for their preparation. It is a further object to provide new epoxy ethers of polyhydroxy-phenylchroman derivatives that can be cured to form products having outstanding resistance to deformation at elevated temperatures. It is a further object to provide new glycidyl ethers of certain polyhydroxy-phenylchroman derivatives which have exceptionally good high temperature properties and high degree of hardness. Other objects and advantages of the invention will be apparent from the following detailed description thereof.

It has now been discovered that these and other objects may be accomplished by the new ethers of the present invention comprising polyethers of epoxy-substituted monohydric alcohols and polyalkylhydroxy-phenylchroman derivatives containing at least three phenolic hydroxyl groups per molecule. It has been found that these special epoxy ethers can be readily cured with epoxy curing agents, such as amines and anhydrides, to form products having exceptionally good high temperature properties and very great hardness. Thus, as shown in the Example I at the end of the specification, the glycidyl ether of the polyalkylhydroxy-phenylchroman derivative gives a cured product having a heat distortion point of 170° C. and a Rockwell hardness value of 97. A glycidyl ether of bis-phenol, on the other hand, when cured under related conditions has a heat distortion point of only about 143° C. and a Rockwell hardness of about 65.

The chroman derivatives used according to the invention are polyalkylhydroxy-phenylchroman derivatives containing at least three phenolic hydroxyl groups per molecule. Preferred compounds of the group have the formula

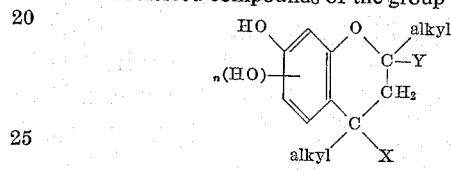

in which X and Y are dissimilar and either an alkyl group or a

group, and in which $n$ is 1 or 0. The alkyl groups are preferably methyl groups. Examples of the compounds include, among others, 2,4,4-trimethyl-7,2',4'-trihydroxyflavan, 2,4,4-trimethyl-5,7,2',4',6'-pentahydroxyflavan, 2,4-diethyl-4-methyl-7,2',4'-trihydroxyflavan and 2,4,4-trimethyl-6,7,2',4',5'-pentahydroxyflavan.

These new chroman derivatives may be prepared by reacting a polyhydric phenol with a ketone in the presence of a strong acid as described in U.S. 2,418,459. To obtain the products in crystalline form, however, certain conditions should be employed. Thus, one must use at least 50 parts of water per 100 parts of polyhydric phenol and preferably from 80 to 120 parts. Secondly, the temperature used in the reaction should not exceed 70° C. and should preferably be between 50 to 60° C. Thirdly, the acid catalyst should be a strong inorganic acid and should not be used in excess of 20% by weight of the phenol and preferably in amounts of 2 to 15% by weight of phenol. The ketone and polyhydric phenol are preferably employed in mol ratios of 1:1 to 2:1. A more detailed description of the preparation of the new chroman derivatives may be found in copending application Bruin et al., Serial No. 659,462, filed May 16, 1957.

The preparation of one of the new chroman derivatives is illustrated by the following:

*Preparation of 2,4,4-trimethyl-7,2',4'-trihydroxyflavan*

550 parts of resorcinol were dissolved in 550 parts of water. 145 parts by weight of acetone and 94 parts by weight of 37% HCl were added to the solution. This mixture was allowed to stand at room temperature for 48 hours when a crystal slurry slowly separated off. The crystals were then sucked off and washed with distilled water and dried in vacuo at 70° C. The product which was identified as 2,4,4-trimethyl-7,2',4'-trihydroxyflavan was a white crystalline powder and had a melting point of 225° C.

The epoxy-substituted alcohols, the novel ethers of which are provided by the present invention comprise those monohydric alcohols possessing at least one epoxy group, i.e. a

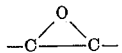

group. Examples of these alcohols include 2,3-epoxypropanol(glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-4-propanol, 2,3-dimethyl-4,5-epoxyoctanol, 2-methoxy-4,5-epoxyoctanol, 3,4-epoxy-5-chlorocyclohexanol, 2,3-epoxypropoxypropanol, 2,3-epoxypropoxyhexanol, 2,3-epoxypropoxyheptanol, 2,3-epoxydodecanol and 4-chloro-5,6-epoxydodecanol.

Preferred epoxy-substituted alcohols are the epoxy-substituted aliphatic and cycloaliphatic monohydric alcohols containing from 3 to 15 carbon atoms, such as 2,3-epoxypropanol, 3,4-epoxybutanol, 3,4-epoxydodecanol, 2-methyl-2,3-epoxypropanol, 2,3-epoxycyclohexanol, 2,3-epoxypropoxyethanol, 2,3-epoxypropoxyoctanol and the like.

Particularly preferred epoxy-substituted alcohols are the epoxyalkanols, epoxyalkoxyalkanol, epoxycycloalkanols and epoxyalkoxycycloalkanols, and particularly those containing not more than 12 carbon atoms, such as 2,3-epoxypropanol, 3,4-epoxyhexanol, 2,3-epoxypropoxyoctanol, 2,3-epoxy-5-octanol, 2,3-epoxy-6-dodecanol, 2,3-epoxypropoxy-5-octanol, 3,4-epoxycyclohexanol, 2,3-epoxypropoxy-4-cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest because of the ease of preparation of their ethers as well as the superior properties possessed by such ethers.

The ethers may be obtained by various methods. The epoxy ethers of the new chroman derivatives are preferably obtained by reacting the chroman derivative with an epoxy-halo-substituted alkane or a dihalohydroxy-substituted alkane in an alkaline medium.

The expression "halo-epoxy-substituted alkanes" as used herein refers to those alkanes having a 1,2-epoxy group, i.e. a

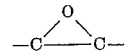

group, attached directly to a halogen-bearing carbon atom, such as, for example, epichlorohydrin, epibromohydrin, 1,4-dichloro-2,3-epoxybutane, 1-chloro-2,3-epoxypentane, and the like. The expression "dihalo-hydroxy-substituted alkanes" as used herein refers to those alkanes having a series of at least three carbon atoms one of which is attached to a halogen atom, the next is attached to a hydroxyl group and the last is attached to a halogen atom, such as, for example, 1,3-dichloro-2-hydroxy-propane, 2,4-dibromo-3-hydroxypentane, 2,3-dichloro-3-hydroxybutane, and the like. Epichlorohydrin comes under special consideration because of its low cost and because of the superior properties of the epoxides obtained therefrom.

The amount of the chroman derivative and epoxy-forming material to be employed in this reaction will vary depending upon the type of product desired. If simple monomeric type products are desired, the phenol and epoxy-forming material are preferably reacted in chemically equivalent ratios varying from 1:4 to 1:16. If higher molecular weight hydroxy-containing products are desired, the epoxy-forming materials are used in smaller amounts and the chroman derivative and epoxy-forming materials are reacted in chemical equivalent ratios varying from 2:1 to 1.8:1. As used herein, "chemical equivalent" amount refers to the amount needed to furnish one OH group for every epoxy group.

The desired alkalinity is obtained by adding basic substances, such as sodium or potassium hydroxide. The alkali is employed in at least chemical equivalent amounts, e.g. one mol of alkali for every epoxy group to be reacted and is preferably utilized in excess of the epoxy-halo-substituted alkane.

The above reaction is preferably conducted by heating the mixture at temperatures ranging from about 50° C. to 150° C. and more preferably from about 80° C. to 125° C. Atmospheric, superatmospheric or subatmospheric pressures may be utilized as desired.

The water formed in the reaction may be removed during or at the end of the reaction. At the completion of the reaction, the water and excess reactants, such as excess halo-epoxy-substituted alkanes are preferably removed by distillation and the residue that remains then treated with an appropriate solvent, such as benzene and filtered to remove the salt. The product that remains may then be purified by any suitable method, such as by distillation, extraction, and the like.

The polyepoxide ethers described above vary from viscous liquids to crystalline solids. They have more than one epoxy group per molecule and have solubility in various solvents and oils.

For certain applications, such as in the preparation of polymeric products, it is sometimes desirable to have higher molecular weight hydroxy-containing polyether polyepoxides. Such products may be obtained by varying the amount of the polyhydric phenol and the halo-epoxy-substituted alkane in the alkaline medium, as described above, or by reacting the above-described new polyether polyepoxides with polyhydric compounds. In this case, the polyhydric compound reacts with the

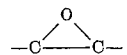

group to form

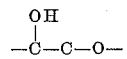

groupings. Higher molecular weight products may be obtained from the glycidyl ether of 2,4,4-trimethyl-7,2',4'-trihydroxyflavan, for example, by reacting X moles of that compound with one mole of a polyhydric phenol having X OH groups. Such products have the formula

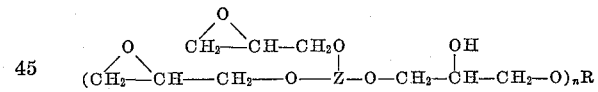

wherein Z is the residue of the 2,4,4-trimethyl-7,2',4'-trihydroxyflavan, R is the residue of the polyhydric phenol and $n$ is an integer representing the number of OH groups on the polyhydric phenol molecule. Polyhydric compounds used for this purpose may be any polyhydric alcohol or polyhydric phenol. Polyhydric phenols that may be used for this purpose, include, among others, resorcinol, catechol, hydroquinone, methyl resorcinol and polynuclear phenols, such as 2,2-bis(4-hydroxyphenyl)propane.

In case the polyhydric material employed in the above reaction is a polyhydric phenol, the reaction may generally be accomplished by merely heating one or more of the new polyether polyepoxides with the phenol. Temperatures preferably range from about 50° C. to 80° C.

If the resulting higher molecular weight products possess less than the desired number of epoxy groups, such as may be the case when the dihydric material is reacted with less than a double molar quantity of the polyether polyepoxide, additional epoxy groups may be introduced by reacting the higher molecular weight product with additional quantities of the epoxy-forming material, e.g. quantities such as would furnish one epoxy group of the OH groups of the polyhydric material to be reacted. Thus, if the higher molecular weight product was obtained by reacting one mole of the polyether of the polyhydroxyphenylchroman derivative with two moles of a dihydric phenol, the resulting higher molecular weight product would then be reacted with approximately two moles of the epoxy-forming material. The higher molecular weight products produced by the above method vary from viscous liquids to solids having relatively high melting points. They possess active epoxy groups as well as hydroxyl groups and may be cured or undergo further reaction through either of these functional groups.

The new polyepoxy ethers and their higher molecular weight derivatives produced as shown in the preceding paragraph may be cured through the epoxy group to form valuable products. They may be cured alone or with other polyepoxide materials in a variety of different proportions, such as, for example, with amounts of other polyepoxides varying from 5% to 95% by weight. Polyepoxides that may be cured with these new polyepoxy ethers and their higher melocular weight products include, among others, glycidyl polyethers of polyhydric phenols obtained by reacting polyhydric phenols, such as bis-phenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenated the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin as described above are also referred to as "ethylene" resins. See Chemical Week, vol. 69, page 27, for September 8, 1951.

A great variety of different curing agents may be employed in effecting the above-described homo- and co-cures. Such agents include, among others, carboxylic acids or anhydrides, such as oxalic acid and phthalic anhydride; Friedel-Crafts metal halides, such as aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetraamine, dicyandiamide, melamine; and salts of inorganic acids, such as zinc fluoborate, potassium persulfate, nickle fluoborate, and magnesium perchlorate.

The amount of the curing agents employed may vary over a considerable range depending upon the agent selected. With curing agents having replaceable hydrogen, such as the amine agents, amounts of agent employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the material being polymerized. With the phosphoric acid and esters, particularly preferred amounts vary from about 1% to 10% by weight. The amino compounds are preferably employed in amounts varying from about 3% to 25% and the salts of the inorganic acids such as the salts of fluoboric acid, are preferably employed in amounts varying from about 3% to 20% by weight. The other curing agents are preferably employed in amounts varying from 1% to 20%.

The higher molecular weight hydroxy-containing ethers may also be cured through the hydroxyl group by the addition of appropriate amounts, e.g., 1% to 25% by weight of polybasic acids or anhydrides, polyisocyanates, and the like.

The cure is preferably effected by mixing the curing agent with the polyepoxide and heating the mixture together, preferably at temperatures ranging from about 40° C. to 200° C. Solvents or diluents may be employed in the cure depending upon the intended application of the product and ease of operation of the curing reaction.

If the new polyether polyepoxides and their higher molecular weight derivatives are to be used in the preparation of castings or pottings, the curing agent and the epoxy material are generally combined together and then poured into the desired mold or casting containing the electrical wires or apparatus and the mixture heated to effect the cure.

The new polyether polyepoxides and their higher molecular weight derivatives may also be employed with the aforedescribed curing agents to prepare improved surface coating compositions. In utilizing the products for this application, it is generally desirable to combine the epoxy material and curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and mixtures thereof; and vinyl polymers, such as polymers of vinyl chloride, vinylidene chloride, methyl methyacrylate, diallyl phthalate, and the like. The coatings prepared in this manner may be allowed to set to a hard finish at room temperature or heat may be applied to hasten the cure.

The higher molecular weight hydroxy-containing derivatives of the new polyether polyepoxides are particularly suited for use in preparing coating compositions as described above, as they may be reacted through the hydroxyl group or groups with drying oil fatty acids or may be cured through the hydroxyl groups with compounds, such as methylol urea or melamines or diisocyanates.

The new polyether polyepoxides and their molecular weight derivatives may also be employed with the curing agents to prepare valuable adhesive and impregnating compositions. In utilizing the products for these applications, it is generally desirable to combine the epoxy material with suitable solvents or diluents, such as benzene, toluene, acetonitrile, and the like, so as to form a spreadable fluid and then the curing agent added and the mixture applied to the desired surface.

In addition to their use in forming the above-described cured products, the claimed epoxy ethers and their higher molecular weight derivatives may be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other stabilizing agents, such as urea and thiourea derivatives. In most cases, the products are effective as stabilizers in amounts varying from about .1% to 5% by weight of the polymer being stabilized. The epoxy materials may be combined with the halogen-containing polymer by any suitable method, such as by dissolving the products in a suitable solvent or by milling the products together on a suitable roll mill.

The invention is illustrated by the following examples. In the examples, parts refer to parts by weight unless otherwise indicated.

EXAMPLE I

This example illustrates the preparation and some of the properties of glycidyl polyether of 2,4,4-trimethyl-7,2',4'-trihydroxyflavan.

180 parts (0.6 mol) of 2,4,4-trimethyl-7,2',4'-trihydroxyflavan were mixed with 1665 parts (18 mol) of epichlorohydrin and 40 parts of water. The resulting mixture was heated to 105° C. after which 156.3 parts of 47% aqueous sodium hydroxide were added dropwise at this temperature over a period of 2.5 hours.

During the reaction which then occurred, an azeotropic mixture of epichlorohydrin and water was distilled off in order to keep the water concentration in the reaction medium constant (at approximately 1% by weight). On cooling, the distillate formed two layers, of which the epichlorohydrin layer was returned to the reaction vessel.

After completion of the reaction, excess epichlorohydrin was removed from the reaction mixture by first distilling at normal pressure until the bottom temperature had risen to 160° C. A vacuum distillation (pressure 3 cm. of mercury) was then applied for half an hour at this temperature. A total of 1,418 parts of epichlorohydrin was recovered. Methyl isobutyl ketone was added to the remaining mixture of epoxy resin and NaCl, in which the resin dissolved. The solution was filtered in order to separate the NaCl. The solvent was then evaporated from the solution. This was done by heating the solution at normal pressure to a bottom temperature of 170° C. The last traces of the solvent were removed by heating in vacuo (22 mm. of mercury) for a further hour at the same temperature.

The yield of epoxy resin was 250 parts. The epoxide equivalent weight was 193 and the Durran's melting point was 63° C. The chlorine content was 0.8% by weight and the viscosity at 23° C. measured as a 40% solution in the monobutyl ether of diethylene glycol was 46.5 centistokes.

The resulting resin was cured with the use of 14.5 parts by weight of m-phenylene diamine per 100 parts by weight of epoxy resin. The mixture was first heated to 60° C. for 2 hours and then to 140° C. for 24 hours.

The product obtained had an excellent resistance to high temperature (heat distortion 170° C. according to ASTM D648: 18.5 kg./sq./cm.). The Rockwell-E hardness was 97. These values are exceptionally high.

The heat distortion point of a cured glycidyl ether of 2,2-bis-(4-hydroxyphenyl)propane obtained as above was about 143° C.

By extraction with boiling methyl ethyl ketone only 0.4% by weight of low-molecular material could be extracted from a given amount of the above-described novel cured epoxy resin.

Related results are obtained by replacing the 2,4,4-trimethyl-7,2',4'-trihydroxyflavan in the above process with equivalent amounts of each of the following: 2,4,4-trimethyl-5,7,2',4',6-pentahydroxyflavan and 2,4-diethyl-4-methyl-7,2',4'-trihydroxyflavan.

EXAMPLE II 240 parts (0.8 mol) of 2,4,4-trimethyl-7,2',4'-trihydroxyflavan were mixed with 2,220 parts (24 mol) of epichlorohydrin and 50 parts of water. The mixture obtained was heated to 105° C. after which 2,084 parts of 47% aqueous sodium hydroxide were added dropwise at this temperature over a period of 3 hours.

During the reaction which then occurred, an azeotropic mixture of epichlorohydrin and water was distilled off in order to keep the water concentration in the reaction medium constant (at approximately 1% by weight). On cooling, the distillate formed two layers, of which the epichlorohydrin layer was returned to the reaction vessel.

After completion of the reaction, excess epichlorohydrin was removed from the reaction mixture by first distilling at normal pressure until the bottom temperature had risen to 160° C. A vacuum distillation (pressure 3 cm. of mercury) was then applied for half an hour at this temperature. A total of 1,982 parts of epichlorohydrin were recovered. Methyl isobutyl ketone was added to the remaining mixture of epoxy resin and NaCl in which the resin dissolved. The solution was filtered in order to separate the NaCl. The solvent was then evaporated from the solution. This was done by heating the solution at normal pressure to a bottom temperature of 170° C. The last traces of the solvent were removed by heating in vacuo (22 mm. of mercury) for a further hour at the same temperature.

The yield of epoxy resin was 335 parts. The epoxide equivalent weight was 196 and the Durran's melting point was 58° C.

The resultant resin was cured with the use of 67 parts by weight of phthalic anhydride per 100 parts by weight of epoxy resin. The mixture was heated to 140° C. for 24 hours.

The product obtained had an excellent resistance to high temperatures (heat distortion 188° C. according to ASTM D648: 18.5 kg./sq./cm.). The Rockwell-E hardness was 86. These values are also exceptionally high.

EXAMPLE III

A tri(3,4-epoxy-cyclohexyl) ether of 2,4,4-trimethyl-7,2',4'-trihydroxyflavan is prepared by reacting 3-cyclohexenyl chloride with 2,4,4-trimethyl-7,2',4'-trihydroxyflavan in alkali and then epoxidizing the resulting product with peracetic acid at 0° C. to 15° C.

100 parts of the tri(3,4-epoxycyclohexyl) ether produced above is cured to a hard solvent resistant coating by heating with 18 parts of meta-phenylene diamine at 150° C. The tri ether is also cured to a hard solvent resistant product by heating with 65 parts of maleic anhydride.

The invention claimed is:

1. Polyethers of 1,2-epoxy-substituted monohydric alcohols and poly(lower alkyl) polydroxy-phenylchromans possessing at least three phenolic OH groups.

2. Glycidyl ethers of 2,4,4-trimethyl-7,2',4'-trihydroxyflavan.

3. A cross-linked polymer of the polyethers defined in claim 1 obtained by heating the said polyether at a temperature between 40° C. and 200° C. with an approximately chemically equivalent amount of an epoxy curing agent selected from the group consisting of polycarboxylic acid anhydrides and amines, as used herein chemically equivalent amount refers to that amount needed to furnish one amino hydrogen in case of the amines and one anhydride group in case of the carboxylic acid anhydrides per epoxy group.

4. Glycidyl ethers of compounds of the formula

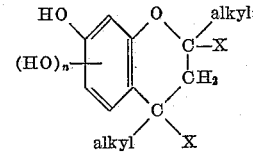

wherein one X is an alkyl and the other is a radical of the formula

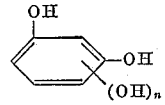

wherein in both formulas, n is an integer from 0 to 1.

5. A process for preparing new epoxy resins which comprises heating at a temperature between 50° C. and 150° C. a poly(lower alkyl)polyhydroxy-phenylchroman possessing at least three phenolic OH groups with epichlorohydrin in an equivalent ratio varying from 2:1 to 1:16 and with at least one mole of alkali per mole of the epichlorohydrin to be reacted.

6. A cross-link polymer as in claim 3 wherein the amine curing agent is m-phenylene amine.

7. A cross-link polymer as in claim 3 wherein the acid anhydride curing agent is phthalic anhydride.

References Cited in the file of this patent

UNITED STATES PATENTS 2,418,459   Bousquet _____ Apr. 8, 1947
2,668,807   Greenlee _____ Feb. 9, 1954